United States Patent
Daruwalla

(10) Patent No.: US 9,871,889 B1
(45) Date of Patent: Jan. 16, 2018

(54) TECHNIQUES FOR AUTOMATED CAPTURE OF CONFIGURATION DATA FOR SIMULATION

(71) Applicant: EMC Corporation, Hopkinton, MA (US)

(72) Inventor: Gev F. Daruwalla, Milford, MA (US)

(73) Assignee: EMC IP Holing Company LLC, Hopkinton, MA (US)

( * ) Notice: Subject to any disclaimer, the term of this patent is extended or adjusted under 35 U.S.C. 154(b) by 246 days.

(21) Appl. No.: 14/217,738

(22) Filed: Mar. 18, 2014

(51) Int. Cl.
*G06F 15/16* (2006.01)
*H04L 29/06* (2006.01)

(52) U.S. Cl.
CPC ............................ *H04L 67/42* (2013.01)

(58) Field of Classification Search
CPC ........................................ H04L 67/42
USPC ......................................... 709/203
See application file for complete search history.

(56) References Cited

U.S. PATENT DOCUMENTS

| | | | | |
|---|---|---|---|---|
| 7,315,807 B1 * | 1/2008 | Lavallee | ............... | H04L 41/145 703/21 |
| 7,478,026 B1 * | 1/2009 | Kushner | ............. | G06F 17/5009 703/13 |
| 7,689,587 B1 * | 3/2010 | Tiruveedi | .......... | G06F 17/30292 707/803 |
| 7,743,171 B1 * | 6/2010 | Hwang | ................. | G06F 3/0611 710/10 |
| 7,743,284 B1 * | 6/2010 | Taylor | ................. | G06F 11/0727 714/42 |
| 7,774,444 B1 * | 8/2010 | George | ................. | H04L 41/145 709/217 |
| 8,024,171 B1 * | 9/2011 | Korolev | ................ | G06F 11/366 703/13 |
| 8,095,764 B1 * | 1/2012 | Bauer | .................... | G06F 3/0605 711/162 |
| 8,321,854 B1 * | 11/2012 | Zarafyants | .............. | G06F 8/427 717/112 |
| 8,346,788 B1 * | 1/2013 | Kim | .................. | G06F 17/30286 707/756 |
| 8,418,072 B1 * | 4/2013 | Bauer | ...................... | G06F 8/38 709/223 |

(Continued)

OTHER PUBLICATIONS

U.S. Appl. No. 13/798,545, filed Mar. 13, 2013, Joyce, et al.
U.S. Appl. No. 14/108,653, filed Dec. 17, 2013, Labaj, et al.

*Primary Examiner* — Philip Chea
*Assistant Examiner* — Wing Ma
(74) *Attorney, Agent, or Firm* — Muirhead and Saturnelli, LLC

(57) ABSTRACT

Described are techniques for processing command requests. A plurality of requests are issued from a client to a server. The server has a current configuration. Each of the plurality of requests requests a portion of current configuration information describing the current configuration of the server. Response are sent from the server to the client. Each response includes a portion of the current configuration information describing the current configuration of the server. A first set of configuration files is determined in accordance with portions of the current configuration information included in the responses. The client services a second plurality of command requests using a simulator by processing the second set of command requests in accordance with a simulation mode and the first set of one or more configuration files.

22 Claims, 10 Drawing Sheets

(56) References Cited

U.S. PATENT DOCUMENTS

| | | | | |
|---|---|---|---|---|
| 8,447,729 B1* | 5/2013 | Wang | G06F 17/30569 | 707/613 |
| 8,447,873 B1* | 5/2013 | Joyce | G06F 9/54 | 709/203 |
| 8,532,973 B1* | 9/2013 | CaraDonna | G06F 3/067 | 703/13 |
| 8,601,025 B1* | 12/2013 | Shajenko | G06F 17/30958 | 707/720 |
| 8,688,703 B1* | 4/2014 | Antova | G06F 17/30289 | 707/713 |
| 8,924,595 B1* | 12/2014 | Joyce | G06F 3/061 | 710/5 |
| 8,938,477 B1* | 1/2015 | Tang | G06F 17/30289 | 707/769 |
| 2002/0019908 A1* | 2/2002 | Reuter | G06F 3/0605 | 711/112 |
| 2002/0052725 A1* | 5/2002 | Wasynczuk | G05B 17/02 | 703/22 |
| 2004/0015600 A1* | 1/2004 | Tiwary | G06F 11/3414 | 709/234 |
| 2004/0139240 A1* | 7/2004 | DiCorpo | G06F 3/0617 | 710/3 |
| 2004/0193397 A1* | 9/2004 | Lumb | G06F 13/105 | 703/24 |
| 2004/0230404 A1* | 11/2004 | Messmer | G06Q 10/00 | 703/1 |
| 2004/0254777 A1* | 12/2004 | Foreman | G06F 11/261 | 703/21 |
| 2005/0228937 A1* | 10/2005 | Karr | G06F 3/0607 | 711/6 |
| 2006/0095547 A1* | 5/2006 | Cohn | H04L 67/2847 | 709/220 |
| 2008/0155517 A1* | 6/2008 | Yan | G06F 11/3466 | 717/140 |
| 2008/0313109 A1* | 12/2008 | Machulsky | G06F 3/0604 | 706/12 |
| 2009/0006897 A1* | 1/2009 | Sarsfield | G06F 11/3684 | 714/38.14 |
| 2009/0157809 A1* | 6/2009 | Defrang | H04L 67/42 | 709/203 |
| 2009/0319249 A1* | 12/2009 | White | G09B 19/0053 | 703/13 |
| 2011/0231172 A1* | 9/2011 | Gold | G06F 11/3433 | 703/13 |
| 2011/0231541 A1* | 9/2011 | Murthy | G06F 3/0613 | 709/224 |
| 2013/0297907 A1* | 11/2013 | Ki | G06F 12/0684 | 711/170 |
| 2015/0113619 A1* | 4/2015 | Ramdass | H04L 63/04 | 726/6 |
| 2016/0234686 A1* | 8/2016 | Bone | H04L 63/062 | |

* cited by examiner

500

510

```
<DemoCaptureObjects>
    <DemoCaptureObject action="List" containerName = "LUNS"
    objectname = "LUN" >
    <Filters><Filter name = "StorageProcessor_ID" value="3000"/>
    </Filters></DemoCaptureObject>
    ..
</DemoCaptureObjects>
```
512

520

```
<DemoCaptureObjects>
    <DemoCaptureObject action="List" containerName = "DISKS"
    objectname = "DISK" >
    <Filters><Filter name = "StorageProcessor_ID" value="3000"/>
    </Filters></DemoCaptureObject>
    ..
</DemoCaptureObjects>
```
522

FIGURE 8

TECHNIQUES FOR AUTOMATED CAPTURE OF CONFIGURATION DATA FOR SIMULATION

BACKGROUND

Technical Field

This application relates to techniques used in connection with simulation, and more particularly, in connection with obtaining configuration data for use with simulation of a configuration such as a data storage system configuration.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Management software may be used in connection with management of data storage systems. The management software, as well as more generally any software, may obtain inputs used in connection with performing an operation or task. For example, user inputs may be obtained using a user interface. The management software may be characterized as a client which issues requests to a server, such as a data storage system, in connection with performing requested operations.

SUMMARY OF THE INVENTION

In accordance with one aspect of the invention is a method for processing command requests comprising: issuing, from a client to a server, a plurality of command requests, wherein said server has a current configuration and each of the plurality of requests is a request for a portion of current configuration information describing the current configuration of the server; sending, from the server to the client, a plurality of responses responsive to receiving said plurality of command requests, wherein each of the plurality of responses includes a portion of the current configuration information describing the current configuration of the server; determining, in accordance with portions of the current configuration information included in the plurality of responses, a first set of one or more configuration files; and servicing, by the client, a second plurality of command requests using a simulator by processing the second set of command requests in accordance with a simulation mode and the first set of one or more configuration files. The plurality of command requests may include a first portion of command requests for generic configuration information applicable to any supported type of server. The plurality of command requests may include a second portion of command request for server specific information dependent on a particular type of server. The server may be a data storage system and the current configuration information may be stored on the server and may describe a current data storage configuration of the data storage system. The current configuration information stored on the server may include a first set of objects representing a first set of physical and logical entities in the current data storage system configuration and the first set of one or more configuration files may also include the first set of objects representing the first set of physical and logical entities in the current data storage system configuration. The first set of objects may include an object representing any of a logical storage device having storage provisioned on one or more physical devices, a disk, a RAID group, a fan, a power supply, a physical disk enclosure, and a processor. The plurality of responses may include a first portion of responses received in response to the first portion of command requests and a second portion of responses received in response to the second portion of command requests. The first set of one or more configuration files may include one or more generic configuration files and one or more server-specific configuration files. The method may further include storing, at the client, the first portion of responses in a first cache; storing, at the client, the second portion of responses in a second cache; extracting first configuration information from the first cache; converting the first configuration information into first converted information having a format usable by the simulator; storing the first converted information in the one of more generic configuration files; extracting second configuration information from the second cache; converting the second configuration information into second converted information having a format usable by the simulator; and storing the second converted information in the one or more server-specific configuration files. When the client is servicing the second plurality of command requests using a simulator, the client may not be connected to the server. Servicing a first command request of the second plurality of command requests may include reading a first set of configuration data describing a first simulated configuration of the server, and the method may include retrieving, by the simulator, the first set of configuration data from the first set of one or more configuration files of the client. Servicing a second command request of the second plurality of command requests may include modifying at least some configuration information stored in the first set of one or more configuration files, and the method may include updating, by the simulator, said at least some configuration data to simulate modification of the simulated configuration of the server.

In accordance with another aspect of the invention is a computer readable medium comprising code stored thereon that processes command requests, the computer readable medium comprising code that, when executed, performs a method comprising: issuing, from a client to a server, a plurality of command requests, wherein said server has a current configuration and each of the plurality of requests is a request for a portion of current configuration information describing the current configuration of the server; sending, from the server to the client, a plurality of responses responsive to receiving said plurality of command requests, wherein each of the plurality of responses includes a portion of the current configuration information describing the current configuration of the server; determining, in accordance with portions of the current configuration information included in the plurality of responses, a first set of one or more configuration files; and servicing, by the client, a second plurality of command requests using a simulator by processing the second set of command requests in accordance with a simulation mode and the first set of one or more configuration files. The plurality of command requests may include a first portion of command requests for generic configuration information applicable to any supported type of server. The plurality of command requests may include a second portion of command request for server specific information dependent on a particular type of server. The server may be a data storage system and the current configuration information may be stored on the server and may describe a current data storage configuration of the data storage system. The current configuration information stored on the server may include a first set of objects representing a first set of physical and logical entities in the current data storage system configuration and the first set of one or more configuration files may also include the first set of objects representing the first set of physical and logical entities in the current data storage system configuration. The first set of objects may include an object representing any of a logical storage device having storage provisioned on one or more physical devices, a disk, a RAID group, a fan, a power supply, a physical disk enclosure, and a processor. The plurality of responses may include a first portion of responses received in response to the first portion of command requests and a second portion of responses received in response to the second portion of command requests. The first set of one or more configuration files may include one or more generic configuration files and one or more server-specific configuration files, and the method may further comprise storing, at the client, the first portion of responses in a first cache; storing, at the client, the second portion of responses in a second cache; extracting first configuration information from the first cache; converting the first configuration information into first converted information having a format usable by the simulator; storing the first converted information in the one of more generic configuration files; extracting second configuration information from the second cache; converting the second configuration information into second converted information having a format usable by the simulator; and storing the second converted information in the one or more server-specific configuration files. When the client is servicing the second plurality of command requests using a simulator, the client may not be connected to the server. Servicing a first command request of the second plurality of command requests may include reading a first set of configuration data describing a first simulated configuration of the server, and the method may include retrieving, by the simulator, the first set of configuration data from the first set of one or more configuration files of the client. Servicing a second command request of the second plurality of command requests may include modifying at least some configuration information stored in the first set of one or more configuration files, and the method may further include updating, by the simulator, said at least some configuration data to simulate modification of the simulated configuration of the server.

In accordance with another aspect of the invention is a system comprising: a client; and a data storage system; and wherein the client comprises a first memory including code stored thereon that, when executed, performs a method comprising: issuing, from the client to the data storage system, a plurality of command requests, wherein said data storage system has a current configuration and each of the plurality of requests is a request for a portion of current configuration information describing the current configuration of the data storage system; receiving, from the data storage system at the client, a plurality of responses responsive to receiving said plurality of command requests, wherein each of the plurality of responses includes a portion of the current configuration information describing the current configuration of the data storage system; determining, in accordance with portions of the current configuration information included in the plurality of responses, a first set of one or more configuration files; and servicing, by the client, a second plurality of command requests using a simulator by processing the second set of command requests in accordance with a simulation mode and the first set of one or more configuration files.

BRIEF DESCRIPTION OF THE DRAWINGS

Features and advantages of the present invention will become more apparent from the following detailed description of exemplary embodiments thereof taken in conjunction with the accompanying drawings in which:

FIGS. 7 and 8 are examples illustrating command request files that may be used in an embodiment in accordance with techniques herein;

DETAILED DESCRIPTION OF EMBODIMENT(S)

Figure 1:
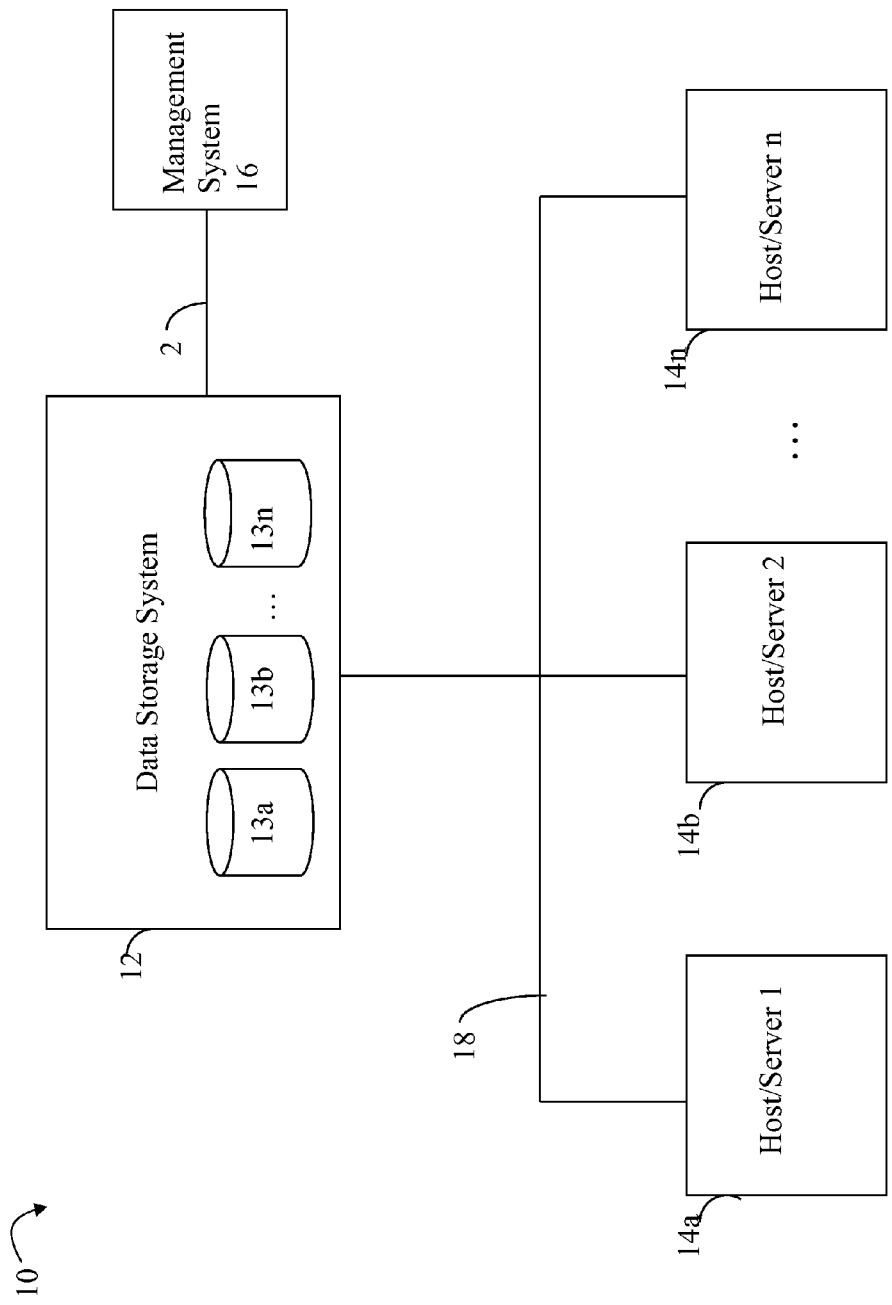
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14*a*-14*n* through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel (FC) connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
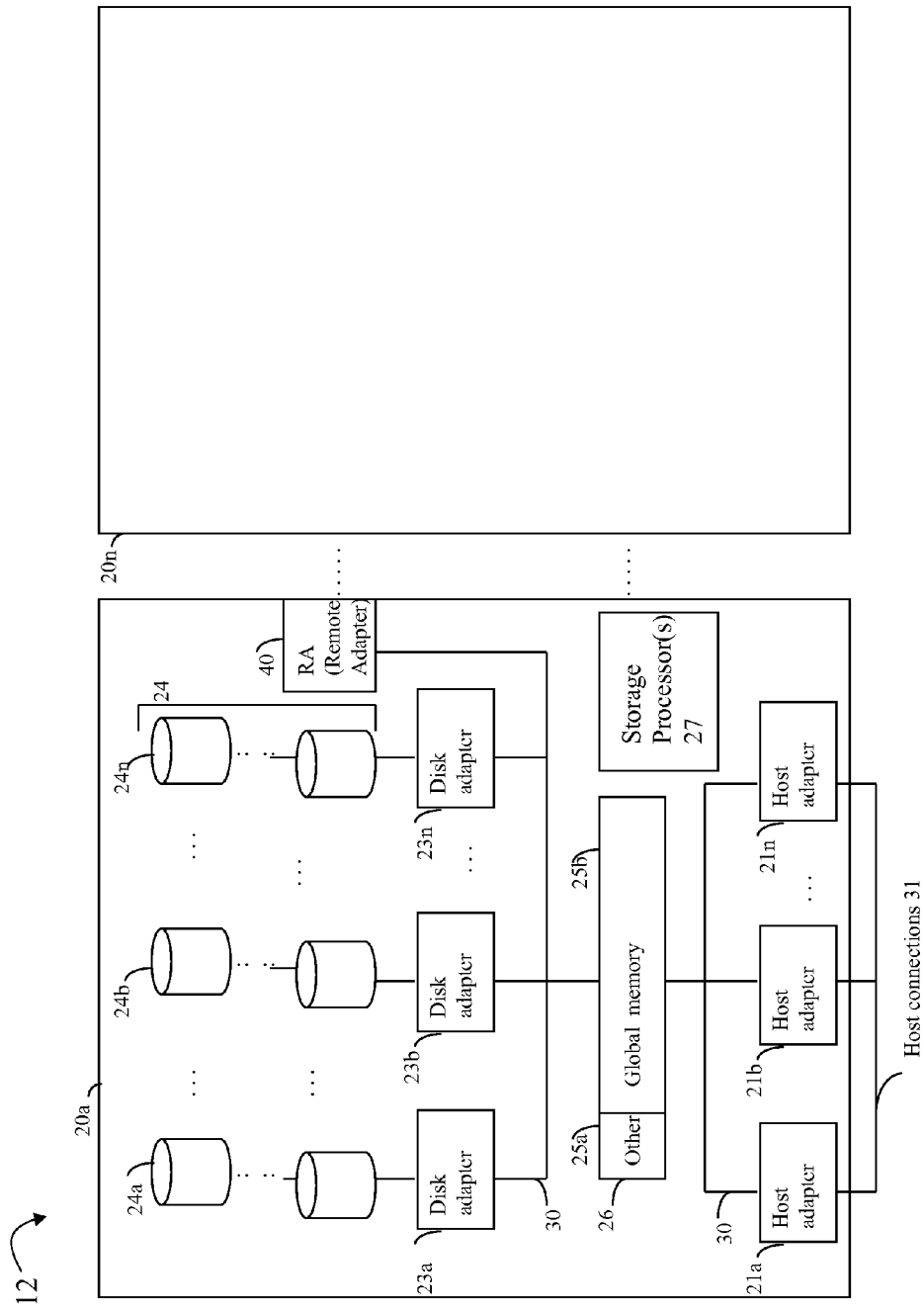
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more storage processors 27. Each of the storage processors 27 may be CPU and an embodiment may include any number of such processors. For example, the VNX® data storage system by EMC Corporation includes two storage processors or main CPUs. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses or other internal connections 30 and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Management software may execute on the data storage system and/or management system. A client, such as a user interface (UI) of the data storage system management software included in the management system 16, may be used by an administrator in connection with performing data storage management operations. For example, the administrator may view information using a graphical UI (GUI) regarding the current data storage configuration, may perform an operation such as create or configure a logical entity such as a RAID group, LUN or LV, storage group (SG) of one or more LUNs, and the like. A logical entity such as a RAID group may be represented by an object having attributes such as indicating a RAID level of the RAID group (e.g., RAID-0, 1, 5, or 6), a number of data and/or parity drives, and the like.

During operation of the data storage system management application, the GUI may issue a command request such as in the form of an API call to first code that performs processing to service the command request. The first code of the API may further perform other calls to lower software layers which result in a request being issued to the data storage system to service the command request. The command request from the GUI may be, for example, in response to a request to obtain (e.g., read) data storage management information from the data storage system for display, to perform an operation such as described above and elsewhere herein which results in a modification to existing data storage configuration data (e.g., write to update existing object) describing the configuration of the data storage system, and the like.

As described herein, simulation may be performed in connection with servicing the command request rather than servicing the command request in non-simulation mode by forwarding to the data storage system. An embodiment in accordance with techniques herein may support simulating the command request. Such simulation may be performed for a variety of different purposes. For example, providing for such simulation used in connection with the GUI may allow testing and use of the GUI and management application without requiring the physical data storage system. Such simulation may be performed, for example, by a client system including the management application whereby the client further includes software to perform the simulation using a set of configuration data that simulates the data storage system configuration. In this manner, a user (e.g., customer or software developer of the management application) may use the management application and its GUI without requiring an actual data storage system and data storage system environment. Code of the GUI may be tested using the simulation mode. More generally, simulation mode may be used to test software included in the client-side management application without requiring use of a data storage system. Other exemplary uses of simulation mode are described elsewhere herein.

As will be described in following paragraphs, a simulator may be used to service command requests such as may be issued by code of the GUI in connection with a user's request, for example, to display information regarding the data storage system and its configuration, modify existing information regarding the data storage system configuration, and the like. In accordance with techniques herein, such requests may be serviced using simulation rather than issuing the request to the data storage system for actual service in non-simulation mode. Command requests may be issued by an application, such as a management application, to code of an application programming interface (API). The API code invoked, and possibly lower software layers, may facilitate communications with the data storage system when in non-simulation mode. When in simulation mode, such requests may be alternatively be serviced using simulation thereby allowing for the GUI of the management application to be utilized and tested for all supported command requests even though the underlying invoked software of the API code may not be fully implement or capable of servicing all such command requests. When the command request is serviced using simulation, the simulator services the command request using configuration data that simulates a data storage system configuration and the simulator also simulates operations performed with respect to this configuration. When a command request is serviced in a non-simulated mode, the command request may be forwarded to actual data storage system for processing in the usual mode of operation thereby requiring the actual data storage system hardware and software and an actual associated data storage system configuration.

Simulation mode provides, for example, simulating modifications made to a data storage system configuration and simulating calls made between lower software layers in the runtime stack as a result of a GUI of a data storage management application issuing a command request to perform an operation. For example, the GUI may issue a command request to an API to perform an operation, such as obtain data storage configuration information for display, perform an operation causing a modification to the existing data storage configuration (e.g., create a new logical entity of the configuration, modify an existing entity of the data storage configuration), and the like. Such API calls may be characterized as simulated if they are performed without using an actual data storage system (e.g., no data storage system hardware required or used) and without the API code performing calls to a data storage system to service the command request. Such API calls to the data storage system may be simulated using a previously generated or obtained set of data storage configuration data. In response to a request made through the GUI of the data storage management application, the request to perform a command may be serviced by simulating such calls, simulating the data storage system and its configuration, and simulating any data storage system configuration operations. As described in more detail below, in some instances, it may be desirable to service command requests (e.g., as may be issued as an API call) using simulated configuration data and simulating servicing of the command request using a simulator as if serviced by code of the data storage system using its actual data storage configuration data. As described in more detail in following paragraphs, the command request issued by the GUI may be, for example to view information regarding logical and/or physical data storage system entities of the data storage configuration (e.g., list physical storage devices and associated properties and statuses, list logical storage entities such as logical devices having storage provisioned on physical storage devices, list properties of such logical devices), perform an operation (e.g., create, delete, modify) with respect to a logical storage entity (e.g., logical storage device, storage group of one or more logical storage devices)) of the configuration, and the like.

An embodiment in accordance with techniques herein may provide for configuring the client to operate in accordance with simulation mode or non-simulation mode for servicing command requests.

Described in following paragraphs are further details regarding a system including a client and data storage system (also more generally a server that services client requests). The client may include software components which provide for automatically capturing an existing configuration of the data storage system and generating data storage configuration files representing the configuration of the data storage system. The data storage configuration files may be used by a simulator, such as one which executes on the client, to simulate a data storage system configuration without requiring a physical connection to the data storage system (e.g., client requests are not serviced by issuing the requests to the data storage system but are rather serviced by simulation with the simulator). The client may include software components which execute data storage system configuration command requests by simulating return responses in accordance with a simulated data storage system configuration using the data storage configuration files. Capturing the existing data storage system configuration real-time (e.g., of a live, fully configured data storage system) may be performed with the client connected to the data storage system where the client issues requests and receives actual responses from the data storage system. The responses returned from the data storage system may report different sets of configuration data representing the current configuration of the data storage system. Subsequently, the simulation of a data storage system configuration may be performed without having the client connected to a data storage system using client-side configuration files based on configuration information included in the responses previously received from the data storage system. In one embodiment, the client includes a simulator which services configuration command requests by simulating returned responses, as if returned by the data storage system, using the previously captured configuration.

Figure 3:
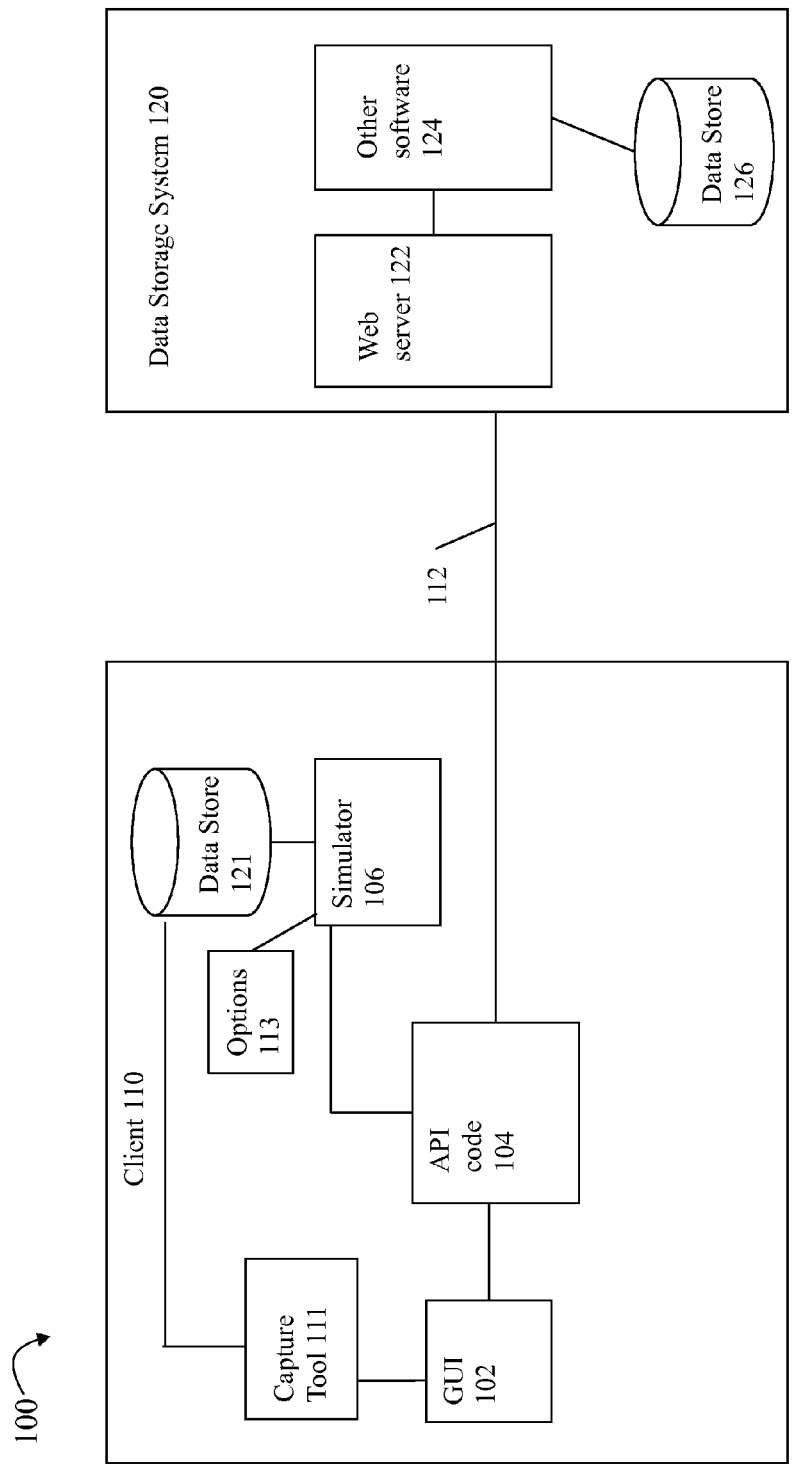
FIG. 3 is an example of components of a client and server of an embodiment that may utilize techniques described herein.

Referring to FIG. 3, shown is an example of components that may be included in an embodiment in accordance with techniques herein. The example 100 includes a client 110 and data storage system 120. The client 110 may be, for example, data storage management software executing on the management system 16 or other computer system or management device. The management software, or more generally client 110, may include code providing a GUI 102, a data storage system configuration capture tool 111, API (application programming interface) code 104 and a simulator 106. The GUI 102 may issue a command in the form of an API call to the API code 104 to perform an operation. For example, the GUI 102 may issue a command to get a list of LUNs or physical storage devices and associated properties whereby the information returned in response to the command will be displayed on a display device or otherwise communicated to the user. The command may be issued in response to a user's request for particular information whereby the request is made via user-input(s) such as from one or more menu selections or other UI elements. The command from GUI 102 may be an API call to API code 104. The API code 104 performs processing to service the requests whereby such processing includes either using the simulator 106 to service the command request, or otherwise issuing a command to the data storage system 120 to service the command request. The API code 104 may be invoked in connection with any one of a set of commands that may possibly be issued from the GUI 102.

For purposes of simplicity of illustration and explanation in some exemplary embodiments described herein, assume that an embodiment provides at least a first setting or option to indicate whether simulation is enabled or disabled for all command requests. It will be appreciated that other variations an options for enabling or disabling simulation mode are possible, some of which are described elsewhere herein.

If the foregoing first setting indicates that simulation mode is enabled, the API code 104 uses the simulator 106 to simulate a data storage system and its configuration thereby utilizing configuration data of the data store 121. When simulation mode is disabled thereby indicating to not service command requests using simulation, the API code 104 does not use the simulator 106 and rather issues the commands to the data storage system 120 over connection 112 (which may be a network connection) for processing. The processing performed to service the commands in non-simulation mode provides for servicing the command in real-time through communication with the data storage system. The data storage system 120 then performs processing to service the command and return any requested information to the API code 104. In accordance with techniques herein, the information returned to the API code 104 as a result of servicing a command may be the same whether the information is returned from the data storage system 120 when operating in a non-simulated mode or whether the information is returned from the simulator 106 when operating in a simulated mode.

In at least one embodiment, the client may be configured to operate in accordance with simulation mode or alternatively non-simulation mode. In such an embodiment, the client may be configured to service all commands using either simulation mode or alternatively non-simulation mode. As an alternative, another embodiment may provide for configuring the client to be capable of executing in both simulation mode and non-simulation mode. In such an embodiment, a determination made by the API code 104 (such as at runtime) of whether to service a command request using the simulator 106 (thereby simulating the data storage system and its configuration), or whether to service the command requested by issuing the request to the data storage system 120 (thereby operating in an non-simulating mode where the command is serviced by the data storage system having a data storage configuration) may be performed at runtime while executing code of the data storage management application including GUI 102.

In one embodiment such as one where the client is configured and capable of executing in both simulation mode and non-simulation mode and whereby a runtime determination is made as to whether to service a command using simulation or non-simulation, an options file 113 may also be utilized. An embodiment may include options 113 read as an input by the simulator 106. The options 113 may include information specifying which one or more command requests for which simulation mode is disabled/serviced using non-simulation mode even if the simulator includes functionality for simulating the identified command requests. In this manner, such identified command requests having simulation mode disabled may always be serviced using non-simulation mode (e.g., without using the simulator 106 and alternatively serviced by issuing the request to the data storage system for servicing using its configuration data). If the simulator 106 includes functionality to simulate a command request and simulation for the command request is not otherwise disabled by the options 113, the command request may be simulated by the simulator 106. For example, the options file 113 may include a setting to enable or disable simulation for all command requests, one or more particular commands, and the like, depending on the level of simulation control enablement provided in an embodiment.

In one embodiment, the simulator 106 may read the options file 113 indicating whether simulation mode is enabled or disabled for some or all commands. During runtime, the API code 104 may communicate with the simulator to determine whether simulation is enabled or disabled and accordingly process the command. If enablement or disablement of simulation is performed on a global level for all commands, the API code 104 may communicate with the simulator 106 for such global settings or options, for example, on start up or initialization of the API code 104 and/or simulator 106. The foregoing and other variations will be appreciated by those skilled in the art.

In this manner, the management application may be executed and include a GUI or other user interface. The GUI 102 may issue a command request to API code 104 which determines whether to service the command using simulation or non-simulation mode. If serviced using simulation, the simulator 106 may be invoked to provide a simulated data storage system and configuration to service the command request. Otherwise, the command request may be serviced using non-simulation by issuing one or more requests to the actual data storage system for processing using its defined data storage system configuration.

As a variation to the foregoing, an embodiment may provide for specifically compiling and generating code for the GUI and other modules used on the client which are either customized to execute in simulation mode, or otherwise customized to execute in non-simulation mode. In this manner, an embodiment may have a first version of executable code and modules on the client when executing in simulation mode and a second different version of executable code and modules on the client when executing in non-simulation mode. In such an embodiment, rather than perform a runtime determination as to whether to service a command request using simulation or non-simulation/real time mode, the code executing on the client may only and always service all commands through either simulation or non-simulation depending on the particular code version and functionality. In one embodiment, code for the foregoing first and second versions may both be stored on the data storage system and a particular version selected and downloaded to the client for use depending on whether command requests will be serviced using simulation or non-simulation. The foregoing and other variations will be appreciated by those skilled in the art.

In connection with the data storage management software, or more generally, any software of a client 110, various user inputs may be obtained in connection with performing a requested operation. For example, a user may select an operation to be performed in connection with data storage management. The user may also provide additional inputs specifying parameters for the operation using the GUI in connection with performing the requested operation. When servicing a command to perform an operation in a non-simulation mode, the management software may be characterized as a client 110 which issues requests on behalf of a user to the data storage system 120 to perform a data storage management operation or task such as, for example, view selected portions of data storage configuration information regarding a current configuration and state of the data storage system (e.g., list of currently defined LUNs, SGs of LUNs (e.g., an SG may be a logical entity of one or more associated LUNs), and the like), and create or modify the current data storage configuration (e.g., configure or provision physical storage for new LUNs from one or more physical devices (PDs), create or configure new RAID groups, create a new SG, modify an existing SG such as by adding or removing LUNs, and the like). In connection with such requests received at the data storage system from the management software, the management software may be characterized as a client requesting an operation or service of the data storage system, whereby the data storage system may service the request thereby functioning generally as a server. A client request may be processed and issued to the data storage system 120. The data storage system 120 may include software that services the command request and may return information, if any, to the client 110 in accordance with the particular command request. When servicing a command operating in simulation mode, the management software may be characterized as a client 110 which issues requests on behalf of a user to the simulator 106 which simulates servicing of the command request as if performed by the data storage system using simulated configuration data included in data store 121.

The associated runtime path when executing in simulation mode may include the API code 104 invoking the simulator 106 to service a command request from the GUI 102. The simulator 106 may perform processing to service the command request using simulator configuration data rather using actual configuration data obtained from the data storage system 120. In this manner, the simulator 106 may simulate the presence of a data storage system and its configuration using data of data store 121 and may also simulate services performed by the data storage system in connection with servicing the command request from the GUI 102. Such simulation may have a variety of different suitable uses and applications such as, for example, when testing client-side software, or portions of the client-side software, without requiring the hardware and/or software of a data storage system.

The GUI 102 may generally be characterized as providing the UI for the management software or client 110. For example, the GUI 102 may display screenshots including various UI elements (e.g., menus, buttons, navigation or hyperlinks, and the like). The UI elements may provide for different user interactions. For example, a UI element may be a menu from which a user makes a selection to perform an operation, select parameters for the request, and the like. The GUI 102 may include code for creating the particular UI elements, displaying information and UI elements to the user, interacting with the user, and the like. For example, the GUI 102 may include code for implementing a UI including particular UI elements for a menu, menu items, tables, and the like. The UI elements may include a menu from which a user may select a menu item to perform a particular operation such as display a table of LUNs and properties for those LUNs. In one embodiment, object-based models may be used. For example, each physical and/or logical entity used by the client may be represented by a corresponding object having a set of properties. Each LUN, PD, SG, and the like, may be represented by an object having property values for that particular represented entity. For example, a PD may be a disk having a PD object with properties values based on the physical disk. The disk may have a storage capacity, unique identifier (ID), and type (e.g., FC 10K RPM rotating disk, FC 15K RPM rotating disk, flash or SSD storage device, and the like) where the property values of the PD object are set to denote those particular characteristics for the physical disk being represented.

The GUI 102 may issue a command to the API code 104 that is a request to perform an operation. The command may include one or more parameters. For example, the GUI 102 may issue a command to obtain and return a list of LUNs and one or more selected LUN properties of these LUNs. In turn, the command may be serviced using a simulated data storage system and simulated data storage system configuration as provided by the simulator 106, or the command may alternatively be serviced in a non-simulated mode whereby the command may be issued to the data storage system which performs processing to service the request. The processing performed by the data storage system may be performed in accordance with the actual data storage configuration of data storage system and its current state of various hardware and software components rather than using simulated data storage configuration data. When operating in non-simulation mode, operations which modify (e.g., create, delete, update) objects representing entities of the data storage system configuration result in changes to the actual configuration of the data storage system 120. Similarly, when operating in simulation mode to service a command, such operations to modify objects representing entities in the data storage system configuration may result in changes to the simulated data storage system configuration of data store 121 (e.g., modify the set of data configuration data as stored and used by the simulator 106 representing a modeled data storage system configuration). As noted above, the commands may include requests to read or retrieve configuration data (from either the simulator 106 when servicing the request in simulation mode or from the data storage system 120 when servicing the request in non-simulation mode) whereby such data may then be returned to the API code 104 and then the GUI 102. The commands may also include commands to perform a requested service or operation and may result in writing data (e.g., update existing configuration data or create new instances of data) regarding the data storage configuration.

The simulator 106 may use a set of simulated configuration data included in data store 121 such as, for example, in connection with servicing a command without requiring the actual hardware of the data storage system and interaction with the data storage system. For example, it may be that there is no data storage system 120, that software of the client 110 and/or on the data storage system 120 used in servicing the particular command in non-simulated mode is not available, not implemented and/or otherwise not operational for servicing the request, and the like. In this case, the command may be serviced using the simulator 106. In accordance with techniques herein, the GUI 102 may issue requests to the API code 104 to perform all commands. In turn, depending on how the client is configured, the API code 104 may either service the request operating in a simulation mode (e.g., using the simulator 106) or a non-simulation mode (e.g., issuing the request to the data storage system 120).

When servicing a command using non-simulation mode, the client 110 may issue the command request over connection 112 and communicate with a web server 122 of the data storage system 120. For example, the web server 122 may be an Apache/Tomcat web server. To service the command, the web server 122 may communicate with other software components 124 to perform operations on a database or data store 126 including the data storage system configuration information. Additionally, the other software components 124 may include components which use polling or other techniques to gather state and configuration data regarding the current configuration and status of the data storage system 102. For example, the data storage system 102 may include hardware components as described in connection with FIGS. 1 and 2 and additionally include other software which monitors and collects information regarding the data storage system (e.g., changes in the status of particular physical entities change over time, information regarding the addition and removal of physical entities such as physical disk enclosures, physical storage devices, fans, power supplies and the like) and populates the data store 126 with any required updates for the data storage system configuration data stored therein. When servicing a command using non-simulation mode, the command may be serviced using the actual data storage system configuration data of data store 126.

With reference to FIG. 3, the runtime path or stack for non-simulation mode for issuing a command may be represented by the 102, 104, 112, 124 and 126. The return path may be a reverse traversal of the foregoing path associated with issuing the command. The runtime path or stack for simulation mode for issuing a command may be represented by the 102, 104, and 106. The return path may be a reverse traversal of the foregoing path associated with issuing the command.

Although the simulator and associated functionality are illustrated as being included in the client 110, the simulator and associated functionality may be embodied in one or more other software components on the management system or any other suitable system. It should be noted that although techniques are described herein for use with a data storage system 120, more generally the techniques herein may be used with a server servicing a command request for a client.

With reference to FIG. 3, when the GUI 102 is starting up, one or more command requests may be issued to the API code 104 obtain information used to initially populate a GUI display. The API code 104 may determine whether this particular command request is serviced in a simulated mode whereby the simulator 106 and simulated configuration data are utilized, or whether this particular command request is serviced in a non-simulation mode whereby the request is serviced by the data storage system 120 using its actual configuration data. Assume for purposes of illustration that a command is serviced in a simulation mode using the simulator 106. In this case, the data store 121 may include a set of simulated configuration data used to service the request. The set of configuration data used to simulate a data storage system configuration may describe information for, example, for one or more LUNs and associated properties and information about other objects describing physical and/or logical entities of the simulated data storage system configuration. The simulator 106 may perform processing to simulate servicing the command request as if serviced by the data storage system whereby the simulator returns the requested information for the LUNs described by the simulated data storage system configuration data. If the code of API 104 determines that the command request is not to be simulated, then the command request may be issued to the data storage system for processing in non-simulation mode whereby the current configuration data of the data storage system may include information describing an actual data storage system configuration used to service the request. In non-simulation mode, the command request may be serviced by the data storage system using the data storage system's current configuration data. The data storage system may return to the client the requested information, for example, regarding the LUNs and other objects described by the current data storage system configuration data.

The data capture tool 111 of FIG. 3, which may be used to capture and store data storage configuration information in data store 121, is described in more detail in connection with use of techniques herein to capture a current data storage system configuration of a the data storage system 120.

In one embodiment, the command request and response protocol may be XML-based such that the commands and corresponding responses may be expressed using XML (extended markup language) files and structure known in the art. Additionally, requests and responses may be sent in accordance with the HTTP protocol.

The data storage configuration information as included in data store 121 used by the simulator 106 may be expressed using multiple well-defined complex XML files. In this manner, to use the simulator, developers may have to manually maintain, create and modify such XML files describing the simulated data storage system configuration. Such XML files may be very tedious and error prone to maintain. For example, as new data storage system models are added, changes made to existing configurations, and the like, such additions or modifications need to also be reflected in appropriate updates or additions to the XML files describing the simulated data storage system configuration data of 121. Thus, manually creating and maintaining data storage system configuration files for use with the simulator may be undesirable due to the complexity of such files and the tedious error prone nature of the manual process.

Described in following paragraphs are techniques that may be used in an embodiment for automatically obtaining the data storage system configuration information used for simulating a data storage system configuration. Such techniques may use a tool, such as capture tool 111 which may be a software program, module, or service, to facilitate automatically capturing the configuration data of a "live" or actual data storage system. The captured data storage system configuration information obtained using the capture tool 111 may then be converted, as needed, into a form stored in the data store 121 as used by the simulator to simulate the data storage system configuration. For example, as will be described in more detail below, the techniques may provide for the tool 111 automatically capturing data storage system configuration data describing a current, "live" or real-time data storage system and then converting the captured information into a form, such as described herein and in connection with FIG. 4, understood by the simulator.

In one embodiment, a data capture tool 111 may be used to capture or obtain a current snapshot of a real data storage system whereby such captured configuration data, describing the real data storage system configuration, may then be stored in a form for use by the simulator when simulating a data storage system configuration. In one embodiment, the data capture tool may issue commands to the data storage system such as described herein when executing in non-simulation mode. The data storage system may return responses including the requested configuration data. The returned response data may then be converted and stored in a form consumable by the simulator. In this manner, techniques herein provide for a fully automated capture of a complete live data storage system configuration. The captured configuration data obtained using such an automated data capture tool may be more accurate and less error prone than configuration data files obtained through manual creation since such configuration data is obtained from a real data storage system configuration. Using such a tool, multiple different data storage system configurations may be readily and easily obtained for different data storage system configurations on different models or types of physical data storage systems. Additionally, such techniques may be used in the field, such as at various customer sites, to capture a particular customer's data storage system configuration. The captured customer data storage system configuration data may then be used with the simulator, such as by developers, to debug or analyze the customer's data storage system configuration without requiring a live or onsite connection to the customer site. Additionally, the developers analyzing the customer's simulated current data storage system configuration may also simulate modifications to the customer's configuration in efforts to address and analyze any customer issues. The foregoing are some exemplary advantages and uses of techniques herein as described in more detail below.

Figure 4:
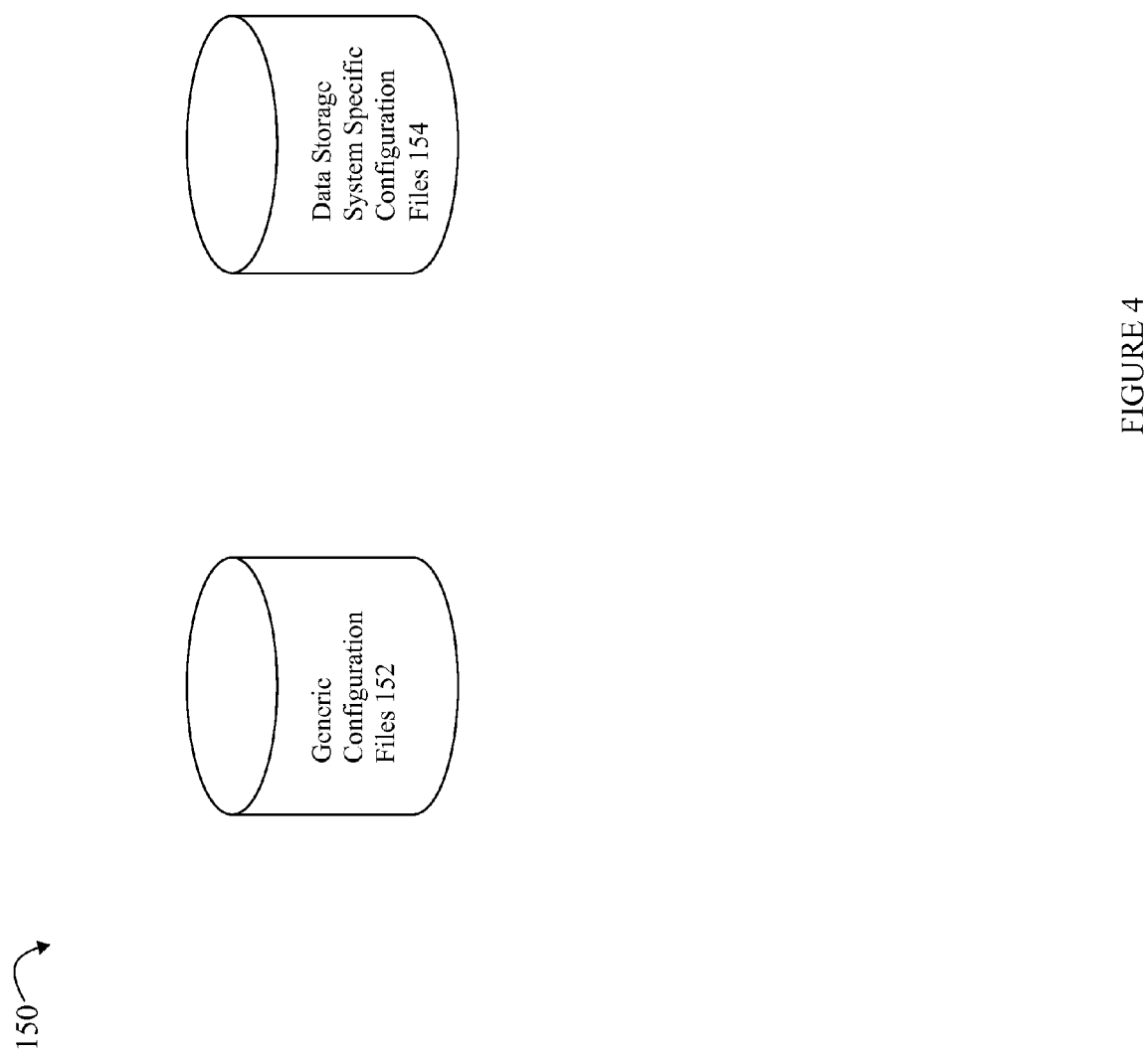
FIG. 4 illustrates configuration data files stored on the client in an embodiment in accordance with techniques herein.

In one embodiment with reference to FIG. 4, the XML files, that describe a single data storage system configuration and are used by the simulator 106, may include one or more generic configuration files 152 and one or more data storage system specific configuration files 154. The configuration files 152 and 154 may include information, for example, such as object definitions for the different simulated data storage system entities in the simulated configuration. The generic configuration files 152 may include information applicable generally to any data storage system type and model. The data storage system specific configuration files 154 may include data storage system-specific or hardware specific information in different files applicable to the different data storage system types and models. For example, in one embodiment, there may be multiple data storage system models each being a different variant of a data storage system array or appliance in the VNX® and/or VNXE® data storage system families by EMC Corporation. Additionally, there may be multiple data storage system models for different variants of a data storage system array or appliance in the VNX® and/or VNXE® data storage system families by EMC Corporation. There may be one or more generic configuration files 152 which are applicable for use in simulating a data storage system configuration for any model of VNX® data storage system and any model of VNXE® data storage system. For each different data storage system model of the VNX® and VNXE® data storage systems, there may be one or more different data storage system specific configuration files 154 which are applicable for use in simulating only one of the particular models. As an illustration, the generic configuration files may include information regarding RAID group configurations and properties and LUNs having storage provisioned. Such object definitions and properties of the generic files may be valid and applicable across all data storage system models and types that can have their data storage system configuration simulated using the simulator. The data storage system specific files may include information for a first model or type of data storage system for a particular hardware component or, property which may only be applicable in the first model or type of data storage system. For example, the data storage system specific files may include information regarding the particular physical storage devices, or drives and associated properties on a particular data storage system whereby such physical devices provide the physical backing storage for the LUNs of the generic configuration files. In this manner, there may also be cross references and dependencies between the objects of the generic and data storage system specific files. For example, there may be a property of an object in the data storage system specific file that references a particular property or instance, of an object in the generic configuration file. Generally, in one embodiment, the generic configuration files may include objects corresponding to the logical entities in the data storage system configuration such as LUNs, RAID groups, storage groups, and the like, and the data storage system dependent configuration files may include objects corresponding to the different physical entities in the data storage system, such as physical devices, disk enclosures, fans, power supplies, processors, and the like.

It should be noted that an embodiment may include multiple different data storage system configuration data sets each including a set of one or more generic files and a set of one or more data storage system specific files as illustrated generally in FIG. 4. When executing in the simulation mode, a user may be able to select one of the multiple sets of configuration data representing different simulated configurations. Such selection may be made in any suitable manner. More generally, an embodiment may use any suitable technique to specify different options used by the client in connection with techniques herein. For example, one embodiment may use a configuration file to identify whether code on the client will execute in simulation mode or non-simulation mode, to select a particular set of configuration data files to use in connection with the data storage system configuration simulation, and the like. As a variation, an embodiment may provide for UI selection of a particular data storage system configuration for simulation. For example, when the software on the client begins execution using the simulator, the user may be prompted to select one of the multiple sets of configuration files for use when simulating a data storage system configuration.

It should be noted that details, such as the particular form or partitioning of configuration data into categories such as generic and data storage system-specific, are described herein as examples for purposes of illustrating techniques herein in an embodiment. More generally, the configuration data files and format used by the simulator may be in any suitable form and format. Such generalizations and others will be readily appreciated by those skilled in the art. Additionally, it should also be noted that the files as illustrated in FIG. 4 may represent the files describing a simulated data storage system configuration provided as input to the simulator 106.

What will now be described in more detail is how the capture tool 111 may be used to capture the existing real data storage system configuration data describing the current configuration of the data storage system 120 of FIG. 3 whereby the tool may then convert the captured data into a form, such as described in FIG. 4, which is consumable by the simulator 106.

Figure 5:
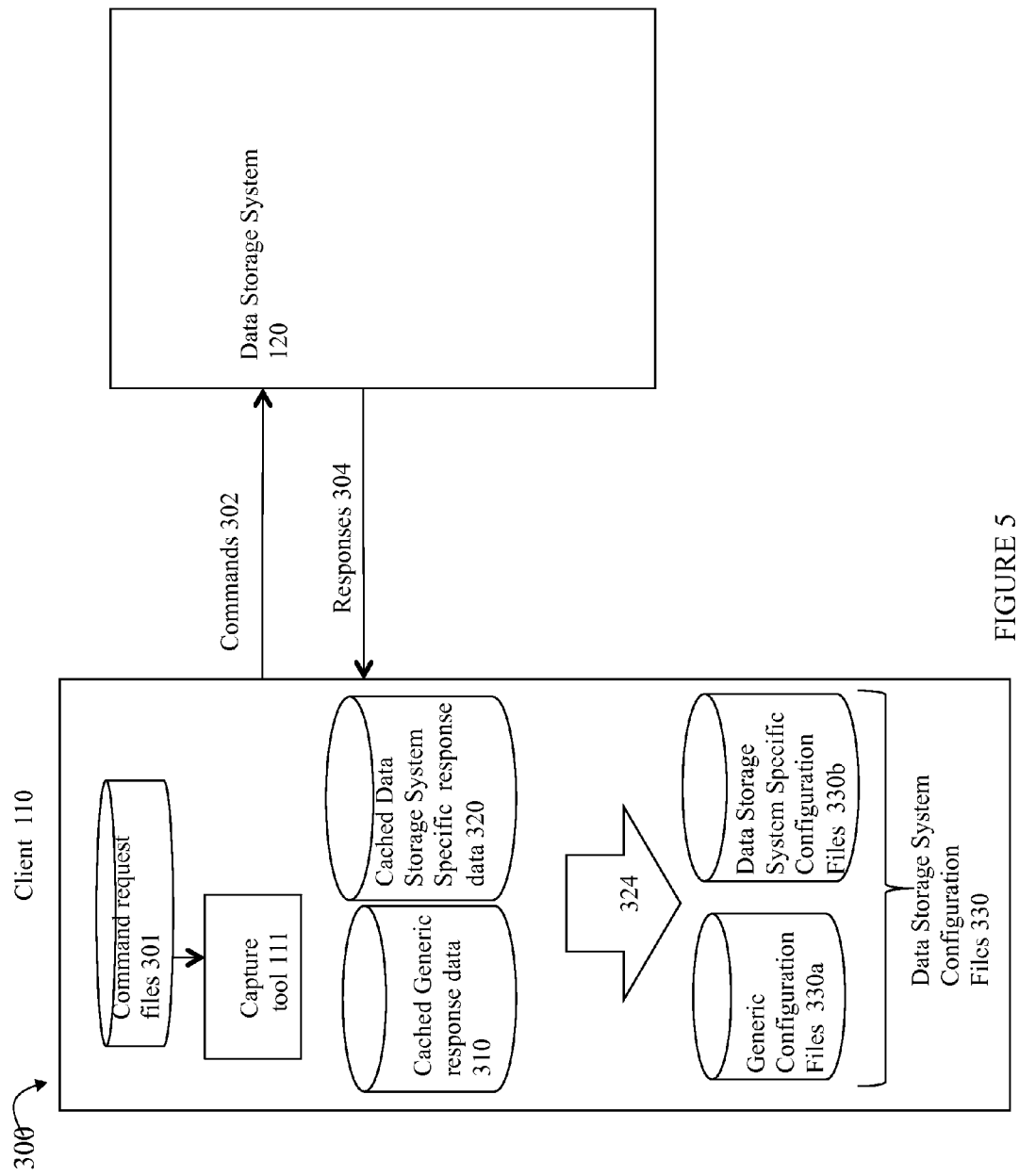
FIG. 5 is an example illustrating data flow between components of the client and data storage system in an embodiment in accordance with techniques herein.

With reference to FIG. 5, in one embodiment, the client 110 may be connected to a real and fully configured data storage system 120. The capture tool 111 may read in one or more command request files 301 which include information regarding which command requests are to be issued to the data storage system. The command request files 301 are described in more detail in following paragraphs. In accordance with the information in the command request files 301, the capture tool 111 forms and issues commands 302 to the data storage system. The data storage system forms and returns corresponding responses 304 including the requested configuration data for the current configuration of the data storage system. For example, the commands may request all possible sets of configuration information for all possible objects in the existing data storage system configuration of the data storage system. The commands and associated responses may be partitioned into generic and data storage system specific information such as described above in connection with FIG. 4. In one embodiment, a first set of commands may request generic configuration information from the data storage system. Such generic information returned in responses to the client may be stored in a first cache of generic response data 310. A second set of commands may request data storage system specific information from the data storage system. Such data storage system specific information returned in responses to the client may be stored in a second cache of data storage system specific response data 320. In one embodiment, two request queues may be used on the client where a first request queue may be used to queue and issue command requests for the generic configuration information and a second request queue may be used to queue and issued command requests for data storage system specific configuration information. Generally, the responses returned for both the first and second command sets noted above result in obtaining a completed set of configuration information describing the complete and current data storage system configuration of the data storage system 120.

Subsequently, processing may be performed on the client to convert 324 the cached response data of 310 and 320 into a form of data storage system configuration files 330 consumable by the simulator. The data storage system configuration files 330 may include one or more generic configuration files 330*a* and one or more data storage system specific configuration files 330*b* each having a form and suitable format such as described in connection with FIG. 4. The foregoing may be performed to capture and store a single set of configuration data. The foregoing process may be repeated multiple times where the client connects to multiple different data storage systems to capture and store a different set of configuration data for each such data storage system.

In one embodiment, the capture tool may execute in the context of a session to a data storage system and may operate in accordance with security mechanisms, such as authentication authorization, roles, and the like, of the client software. Additionally, a unique request ID may be associated with command request issued. An incoming response may be associated with a request ID identifying the corresponding command request for which the response is being returned to the client. The request ID may be included in the returned response data. In this manner using request IDs, the client may perform processing to match up requests and received responses to determine pending command request for which responses have not yet been received from the data storage system. An embodiment may issue requests and return responses using an asynchronous mechanism. For example, a request may be issued from the client and the client continues processing such as with other requests rather than waiting inline for the response. When a response is returned to the client, a callback routine of the client may be invoked to determine a corresponding request for the received response based on a common request ID associated with both the request and response. The callback routine may be registered as the body of code invoked in response to the particular event of receiving a response to a request.

Figure 6:
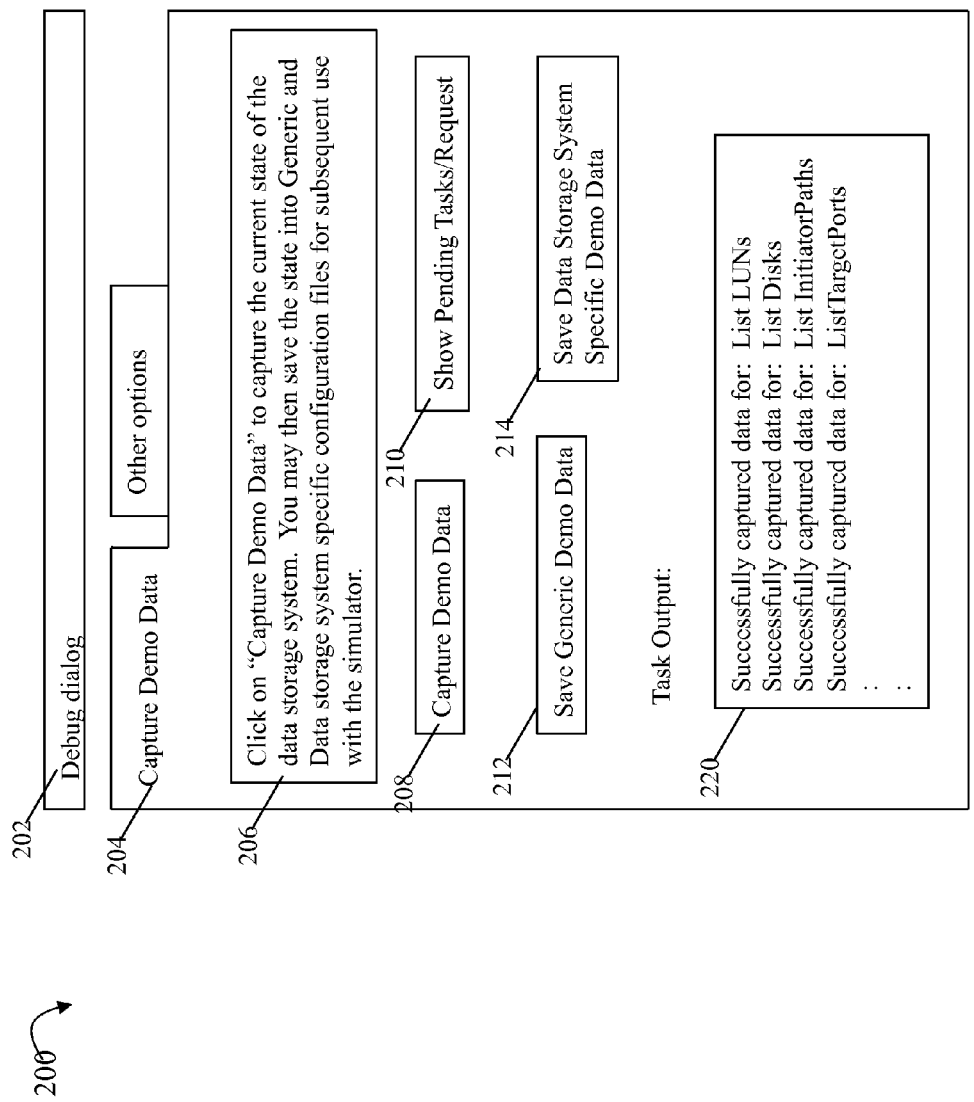
FIG. 6 is an example of a user interface display that may be used in an embodiment in accordance with techniques herein.

Referring to FIG. 6, shown is an example of a user interface display in an embodiment in accordance with techniques herein. The display 200 represents a user interface of the capture tool 11 in one embodiment. In this example, the user interface options for the tool may be exposed through a debug service mode panel as indicated by the debug dialog title 202. The functionality of the capture tool 111 may be exposed through a user interface displayed in response to selecting a particular tab, such as tab 204 to capture demo data. Element 206 may represent an informational panel describing the capture tool operation and steps to create and store data storage system configuration files. As a first step, user interface (UI) element 208 may be selected to capture the current state of the data storage system. UI element 208 may be, for example, a button which, when selected, causes multiple command requests 302 to be issued to the data storage system as described in connection with FIG. 5. The data storage system may return multiple responses to the command requests where such responses include the requested data storage system configuration data such as also described in connection with FIG. 5. Element 220 may represent a display of command requests which are completed to provide the user with progress and feedback regarding completed requests for which responses are received on the client. Area 220 may indicate a completion message when capture of the current data storage system configuration is completed. Consistent with description herein, the completion message may be display when all responses for all client command requests are received. As described in connection with FIG. 5, the captured response data may be stored in two caches 310 and 320. As a next step, the user may select button 212 to convert the cached generic response data 310 into a form consumable by the simulator. In response to selecting button 212, the cached generic response data 310 may be converted and stored in the generic configuration file 330*a*. The user may select button 214 to convert the cached data storage system specific response data 320 into a form consumable by the simulator. In response to selecting button 214, the cached data storage system specific data 320 may be converted and stored in the data storage system specific configuration file 330*b*.

At any point in time during capture processing, a user may select UI element 210. In response to selecting UI element 210 which may be, for example, button, the pending command requests may be displayed such as in area 220 of the UI display. The pending command requests may be those for which a response has not yet been received at the client from the data storage system.

Figure 7:
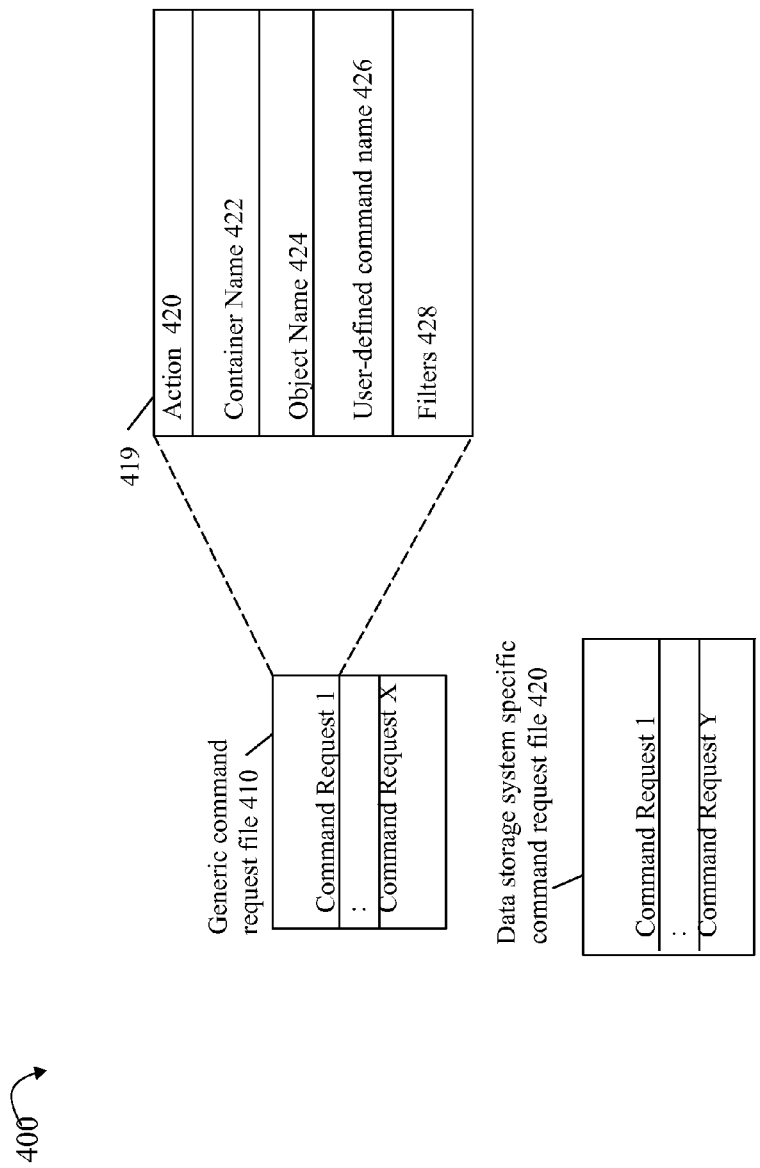

Referring to FIG. 7, shown is an example of command request files 301 including information used by the capture tool to generate command requests in an embodiment in accordance with techniques herein. The example 400 generally illustrates that the command request files 301 (as in FIG. 5) may include a generic command request file 410 and a data storage system specific file 420. The generic command request file 410 may include information used to generate command requests to obtain generic data storage system configuration information. The data storage system specific command request file 420 may include information used to generate command requests to obtain data storage system specific information.

Element 419 illustrates in more detail information that may be included in each of the files 410 and 420 for each command request to be generated by the capture tool. For each command request to be generated, the following may be specified: an action 420, container name 422, object name 424, user-defined command name 426 and filters 428. The action 420 may identify the action, operation, method or API call type performed. For example, List may be an action or type of call performed to obtain a list of information. The container name 422 may identify the name of the container that holds or contains the records of a particular object designated by object name 424. The object name 424 identifies the name of the object on which the action 420 is executed. For example, let container name=LUNS, and object name=LUN. In this case in an embodiment using an XML or other hierarchical structure to describe objects, the container object LUNS may hold the list of one or more LUN objects. The user defined command name 426 may be optionally specified. If specified, it may be used to identify the response received from the data storage system. The naming specified by 426 may appear, for example, on the display 220 of FIG. 6 to identify a particular command request and associated response for captured data. In one embodiment, if no user-defined command name is specified, a default may be provided. For example, in one embodiment, the default name provided may be formed by concatenating the action 420 with the container name 422. Filters 428 may represent one or more filters or additional call information to be applied to the command request. Element 428 may identify, for example, one or more parameters to be specified on the command request.

It should be noted that although element 419 illustrates detail for only a single command request of the generic command request file, information may similarly be specified for each command request in the files 410 and 420.

Referring to FIG. 8, shown is an example of command request information that may be specified in an embodiment in accordance with techniques herein. Element 510 illustrates information that may be included in a generic command request file using XML understood and processed by the capture tool 111. Element 512 illustrates information that may be specified and used to generate a ListLUNS command request to return a list of all LUNs, and for each such LUN object representing a LUN, all properties of the LUN. In this example 512, the Filters tag:

<Filters><Filter name="StorageProcessor_ID" value="3000"/>
</Filters></DemoCaptureObject> may specify parameter or call information included in the command request. With reference to the above, the filter name and value may identify a particular data storage system model (e.g., 3000 in this example) for which the LUN information for all LUNs is returned. The filters of the ListLUNs command request may also allow for parameters to be specified on the call/command request for other variations such as, for example, to only return particular records rather than all records (e.g., for all LUNs) as in this example. For example, the filters may be used to identify one or more particular LUNs for which LUN information is requested such through specifying the filters a unique identifier for each such LUN.

Element 520 illustrates information that may be included in a data storage system specific command request file using XML understood and processed by the capture tool 111. Element 522 illustrates information that may be specified and used to generate a ListDISKS command request to return a list of all DISKS (e.g., physical data storage devices), and for each such Disk object representing a Disk, all properties of the Disk. In this example 522, the Filters tag:
<Filters><Filter name="StorageProcessor_ID" value="3000"/>
</Filters></DemoCaptureObject>
may specify parameter or call information included in the command request and function as just described above in connection with element 512. The filters of the ListDISKS command request may also allow for parameters to be specified on the call/command request for other variations such as, for example, to only return particular records rather than all records (e.g., for all disks) as in this example. For example, the filters may be used to identify one or more particular Disks for which information is requested such through specifying the filters a unique identifier for each such Disk.

If a new object is added, for example, one or more additional command requests may be added to the appropriate generic command request file and/or data storage system specific command request file. Similarly, appropriate entries of the generic and data storage system specific command files may be modified as needed in accordance with any modifications to an existing object. Thus, techniques herein are flexible and easily extendable for use with new or modified objects with the capture tool.

Figure 9:
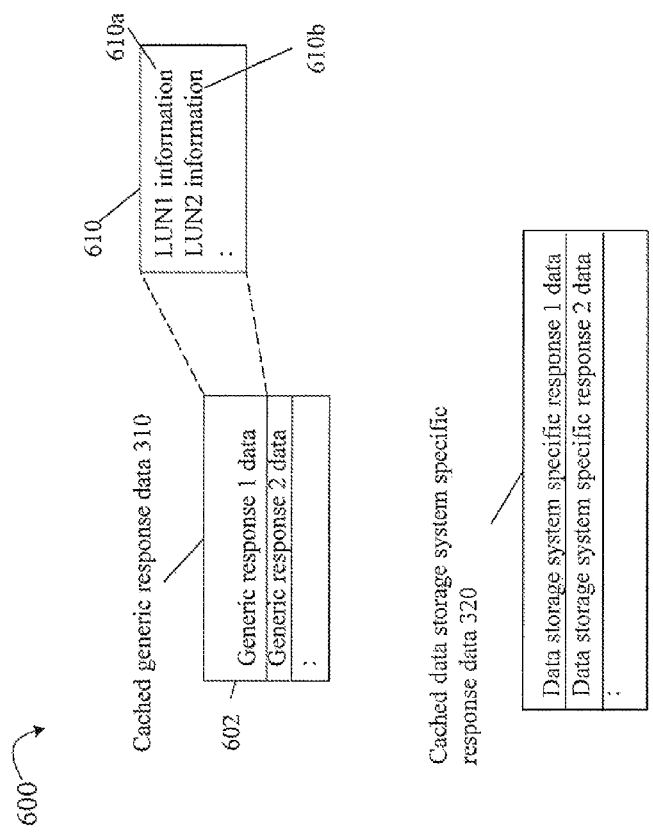
FIG. 9 is an example illustrating cached response data in an embodiment in accordance with techniques herein.

Referring to FIG. 9, shown is an example illustrating in more detail information that may be included in the cached generic response data 310 and cached data storage system specific response data 320 in an embodiment in accordance with techniques herein. The information in 310 and 320 may also be stored in an XML format abstractly represented in the example 600. The cached generic response data 310 may include the response data returned by the data storage system in response to the different command requests issued by the client. In one embodiment, the sets of response data may be concatenated or appear as different entries or fields within the structure of 310. For example, assume 602 represents the response data returned in response to a LIST LUNs command request such as described in connection with FIG. 8. Element 610 may abstractly represent the list of LUN information returned for the LUN objects of the data storage system configuration. Element 610*a* may represent the information for a first LUN, LUN1. Element 610*b* may represent information for a second LUN, LUN2. Consistent with description elsewhere herein, the capture tool may issue generic configuration data command requests and cache such return response data in 310. Subsequently, the cached response data of 310 may be further processed and converted into a form consumable by the simulator. The converted form may be stored in the configuration data files. For example, the conversion processing may extract information from 610 for each LUN object and store such information in a generic configuration file (e.g., such as 330*a* of FIG. 5).

It should be noted that although element 610 illustrates detail for only a single set of response data of the cached generic response data 310, information may similarly be specified and converted for each set of response data of the files 310 and 320.

Figure 10:
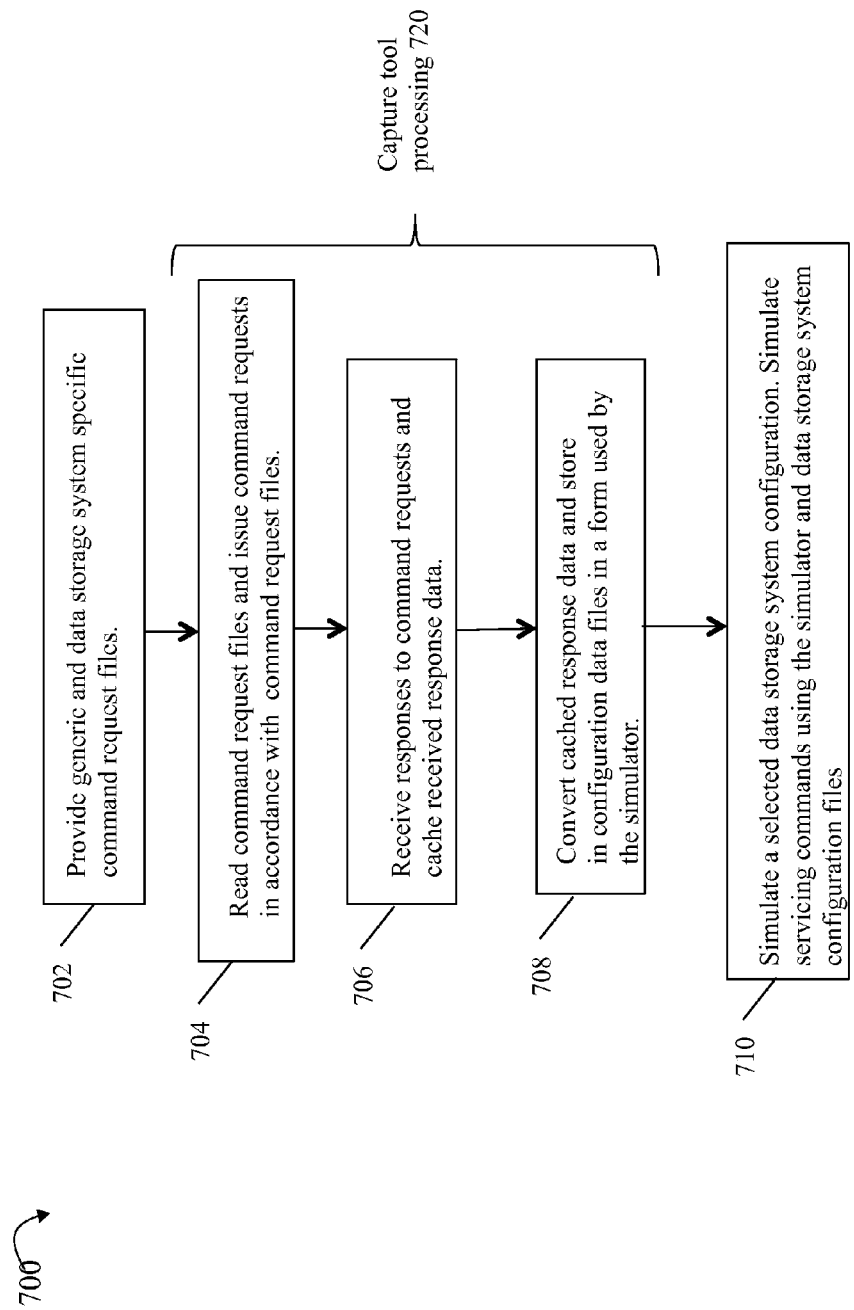
FIG. 10 is a flowchart of processing steps that may be performed in an embodiment in accordance with techniques herein.

Referring to FIG. 10, shown is a flowchart 700 of processing steps that may be performed in an embodiment in accordance with techniques herein. The flowchart 700 summarizes processing described above. In step 702, the generic and data storage system specific command request files may be provided which include information used to generate the necessary command requests to obtain configuration data from the data storage system. In step 704, the command request files are read and command requests are issued from the client to the data storage system in accordance with information specified in the command request files. In step 706, responses to the command requests issued in step 704 are received at the client from the data storage system. The response data is cached such as in the two caches as described elsewhere herein for the generic response data and the data storage system specific response data. In step 708, the cached response data may be converted and stored in one or more configuration data files in a form used by the simulator. Consistent with other description herein, steps 704, 706 and 708 may be included in processing 720 performed by the capture tool. At some later point in time, the data storage system configuration files created in step 708 may be used by the simulator to simulate a data storage system configuration. Such simulation may include servicing commands, such as to read and/or modify different data storage system configuration information, using a set of the data storage configuration files created in step 708 whereby the set represents a single data storage system configuration. In step 708, processing may be performed such as described herein for simulation mode where the simulator on the client may service commands using previously captured and stored configuration data rather than issue commands in real time to a data storage system for servicing based on the data storage system's current configuration. In simulation mode, any response data for the command request is returned by the simulator to the caller in accordance with a simulated data storage system configuration as described by a selected set of data storage system configuration files that may be stored on the client.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium (also referred to as computer readable medium) having any one of a variety of different forms including volatile and nonvolatile, removable and non-removable media implemented in any method or technology for storage of information such as computer readable instructions, data structures, program modules or other data. Computer-readable storage media, or computer-readable medium, includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can be accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for processing command requests comprising:
    issuing, from a client to a server, a plurality of command requests, wherein said server has a current configuration and each of the plurality of command requests is a request for a portion of current configuration information describing the current configuration of the server, wherein each of the plurality of command requests is associated with a unique request identifier that uniquely identifies and distinguishes said each command request from other command requests of the plurality of command requests;
    sending, from the server to the client, a plurality of responses responsive to receiving said plurality of command requests, wherein each of the plurality of responses includes a portion of the current configuration information describing the current configuration of the server and wherein each of the plurality of responses is sent in response to a corresponding one of the plurality of command requests and said each response includes the unique request identifier of the corresponding one of the plurality of command requests;
    responsive to receiving each of the plurality of responses at the client, invoking a callback routine of the client to determine said corresponding one of the plurality of command requests having a same unique request identifier as said each response;
    identifying a set of pending command requests including each command request of the plurality that has been issued by said issuing and wherein said each command request has also not been matched, by the callback routine, with a corresponding response in the plurality of responses received;
    determining, in accordance with portions of the current configuration information included in the plurality of responses, a first set of one or more configuration files; and
    servicing, by the client, a second plurality of command requests using a simulator by processing the second set of command requests in accordance with a simulation mode and the first set of one or more configuration files.

2. The method of claim 1, wherein the plurality of command requests includes a first portion of command requests for generic configuration information applicable to any supported type of server.

3. The method of claim 2, wherein the plurality of command requests includes a second portion of command requests for server specific information dependent on a particular type of server.

4. The method of claim 3, wherein the server is a data storage system and the current configuration information is stored on the server and describes a current data storage configuration of the data storage system.

5. The method of claim 4, wherein the current configuration information stored on the server includes a first set of objects representing a first set of physical and logical entities in the current data storage system configuration and the first set of one or more configuration files also includes the first set of objects representing the first set of physical and logical entities in the current data storage system configuration.

6. The method of claim 5, wherein the first set of objects includes an object representing any of a logical storage device having storage provisioned on one or more physical devices, a disk, a RAID group, a fan, a power supply, a physical disk enclosure, and a processor.

7. The method of claim 1, wherein, when the client is servicing the second plurality of command requests using a simulator, the client is not connected to the server.

8. The method of claim 7, wherein servicing a first command request of the second plurality of command requests includes reading a first set of configuration data describing a first simulated configuration of the server, and the method includes:
    retrieving, by the simulator, the first set of configuration data from the first set of one or more configuration files of the client.

9. The method of claim 8, wherein servicing a second command request of the second plurality of command requests includes modifying at least some configuration information stored in the first set of one or more configuration files, and the method includes:
    updating, by the simulator, said at least some configuration data to simulate modification of the simulated configuration of the server.

10. A non-transitory computer readable medium comprising code stored thereon that processes command requests, the non-transitory computer readable medium comprising code that, when executed, performs a method comprising:
    issuing, from a client to a server, a plurality of command requests, wherein said server has a current configuration and each of the plurality of command requests is a request for a portion of current configuration information describing the current configuration of the server, wherein each of the plurality of command requests is associated with a unique request identifier that uniquely identifies and distinguishes said each command request from other command requests of the plurality of command requests;

sending, from the server to the client, a plurality of responses responsive to receiving said plurality of command requests, wherein each of the plurality of responses includes a portion of the current configuration information describing the current configuration of the server and wherein each of the plurality of responses is sent in response to a corresponding one of the plurality of command requests and said each response includes the unique request identifier of the corresponding one of the plurality of command requests;

responsive to receiving each of the plurality of responses at the client, invoking a callback routine of the client to determine said corresponding one of the plurality of command requests having a same unique request identifier as said each response;

identifying a set of pending command requests including each command request of the plurality that has been issued by said issuing and wherein said each command request has also not been matched, by the callback routine, with a corresponding response in the plurality of responses received;

determining, in accordance with portions of the current configuration information included in the plurality of responses, a first set of one or more configuration files; and servicing, by the client, a second plurality of command requests using a simulator by processing the second set of command requests in accordance with a simulation mode and the first set of one or more configuration files.

11. The non-transitory computer readable medium of claim 10, wherein the plurality of command requests includes a first portion of command requests for generic configuration information applicable to any supported type of server.

12. The non-transitory computer readable medium of claim 11, wherein the plurality of command requests includes a second portion of command requests for server specific information dependent on a particular type of server.

13. The non-transitory computer readable medium of claim 12, wherein the server is a data storage system and the current configuration information is stored on the server and describes a current data storage configuration of the data storage system.

14. The non-transitory computer readable medium of claim 13, wherein the current configuration information stored on the server includes a first set of objects representing a first set of physical and logical entities in the current data storage system configuration and the first set of one or more configuration files also includes the first set of objects representing the first set of physical and logical entities in the current data storage system configuration.

15. The non-transitory computer readable medium of claim 14, wherein the first set of objects includes an object representing any of a logical storage device having storage provisioned on one or more physical devices, a disk, a RAID group, a fan, a power supply, a physical disk enclosure, and a processor.

16. The non-transitory computer readable medium of claim 10, wherein, when the client is servicing the second plurality of command requests using a simulator, the client is not connected to the server.

17. The non-transitory computer readable medium of claim 16, wherein servicing a first command request of the second plurality of command requests includes reading a first set of configuration data describing a first simulated configuration of the server, and the method includes:

retrieving, by the simulator, the first set of configuration data from the first set of one or more configuration files of the client; and wherein servicing a second command request of the second plurality of command requests includes modifying at least some configuration information stored in the first set of one or more configuration files, and the method further includes:

updating, by the simulator, said at least some configuration data to simulate modification of the simulated configuration of the server.

18. A system comprising:
a client; and
a data storage system; and
wherein the client comprises a first memory including code stored thereon that, when executed, performs a method comprising:

issuing, from a client to a server, a plurality of command requests, wherein said server has a current configuration and each of the plurality of command requests is a request for a portion of current configuration information describing the current configuration of the server, wherein each of the plurality of command requests is associated with a unique request identifier that uniquely identifies and distinguishes said each command request from other command requests of the plurality of command requests;

sending, from the server to the client, a plurality of responses responsive to receiving said plurality of command requests, wherein each of the plurality of responses includes a portion of the current configuration information describing the current configuration of the server and wherein each of the plurality of responses is sent in response to a corresponding one of the plurality of command requests and said each response includes the unique request identifier of the corresponding one of the plurality of command requests;

responsive to receiving each of the plurality of responses at the client, invoking a callback routine of the client to determine said corresponding one of the plurality of command requests having a same unique request identifier as said each response;

identifying a set of pending command requests including each command request of the plurality that has been issued by said issuing and wherein said each command request has also not been matched, by the callback routine, with a corresponding response in the plurality of responses received;

determining, in accordance with portions of the current configuration information included in the plurality of responses, a first set of one or more configuration files; and servicing, by the client, a second plurality of command requests using a simulator by processing the second set of command requests in accordance with a simulation mode and the first set of one or more configuration files.

19. The method of claim 3, wherein the first set of one or more configuration files includes one or more generic configuration files and one or more server-specific configuration files, wherein each of the one or more generic configuration files includes objects and properties of configuration information valid across all supported servers simulated by the simulator, wherein each of the one or more server-specific files includes configuration information applicable only for a particular model or type of the supported servers simulated by the simulator.

20. The non-transitory computer readable medium of claim 12, wherein the first set of one or more configuration files includes one or more generic configuration files and one or more server-specific configuration files, wherein each of the one or more generic configuration files includes objects and properties of configuration information valid across all supported servers simulated by the simulator, wherein each of the one or more server-specific files includes configuration information applicable only for a particular model or type of the supported servers simulated by the simulator.

21. The method of claim 19, wherein the plurality of responses includes a first portion of responses received in response to the first portion of command requests and a second portion of responses received in response to the second portion of command requests, and the method further comprises:

storing, at the client, the first portion of responses in a first cache; storing, at the client, the second portion of responses in a second cache; extracting first configuration information from the first cache;

converting the first configuration information into first converted information having a format usable by the simulator;

storing the first converted information in the one of more generic configuration files;

extracting second configuration information from the second cache;

converting the second configuration information into second converted information having a format usable by the simulator; and storing the second converted information in the one or more server-specific configuration files.

22. The non-transitory computer readable medium of claim 20, wherein the plurality of responses includes a first portion of responses received in response to the first portion of command requests and a second portion of responses received in response to the second portion of command requests, and the method further comprises:

storing, at the client, the first portion of responses in a first cache; storing, at the client, the second portion of responses in a second cache; extracting first configuration information from the first cache;

converting the first configuration information into first converted information having a format usable by the simulator;

storing the first converted information in the one of more generic configuration files; extracting second configuration information from the second cache;

converting the second configuration information into second converted information having a format usable by the simulator; and storing the second converted information in the one or more server-specific configuration files.

\* \* \* \* \*

UNITED STATES PATENT AND TRADEMARK OFFICE
CERTIFICATE OF CORRECTION

PATENT NO. : 9,871,889 B1  
APPLICATION NO. : 14/217738  
DATED : January 16, 2018  
INVENTOR(S) : Gev F. Daruwalla Page 1 of 1

It is certified that error appears in the above-identified patent and that said Letters Patent is hereby corrected as shown below:

On the Title Page

(73) Assignee should read: EMC IP Holding Company LLC, Hopkinton, MA (US)

Signed and Sealed this  
Twenty-seventh Day of November, 2018

Andrei Iancu  
*Director of the United States Patent and Trademark Office*